Oct. 18, 1955 E. T. LORIG 2,720,692
METHOD OF MAKING A SELF-CENTERING ROLL
Filed June 25, 1952

INVENTOR.
EDWIN T. LORIG
BY
Donald G. Dalton
HIS ATTORNEY

United States Patent Office 2,720,692
Patented Oct. 18, 1955

2,720,692

METHOD OF MAKING A SELF-CENTERING ROLL

Edwin T. Lorig, Pittsburgh, Pa., assignor to United States Steel Corporation, a corporation of New Jersey Application June 25, 1952, Serial No. 295,504

1 Claim. (Cl. 29—148.4)

This invention relates to a method of making a self-centering roll of the general type shown in my patent No. 2,592,581, dated April 15, 1952. The roll of the patent is provided with a plurality of flexible projections on its outer periphery arranged on both sides of a transverse central plane with the projections being under-cut and inclined radially toward the axis of the roll away from the transverse central plane. In some instances the under-cut is molded into the roll and in other instances flexible discs having spaces therebetween are mounted on a shaft. The discs shown in the patent are relatively thick and are arcuate in shape. These rolls are somewhat expensive to manufacture.

It is therefore an object of my invention to provide an inexpensive method of making a self-centering roll.

This and other objects will be more apparent after referring to the following specification and attached drawings, in which.

Figure 1:
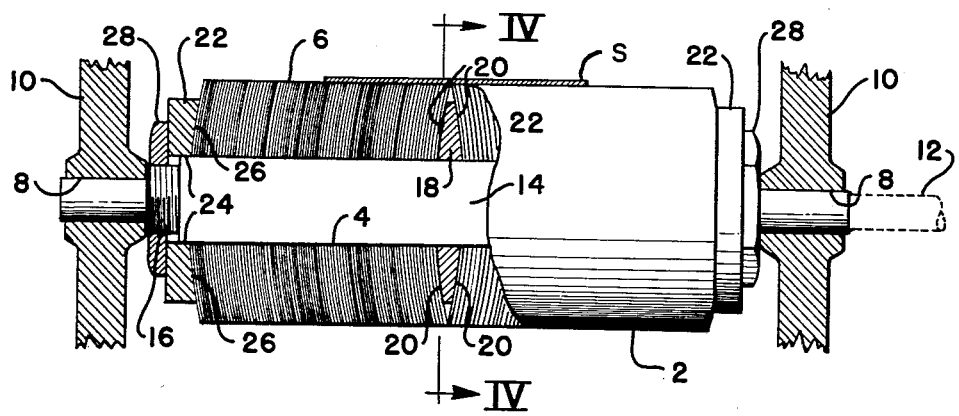
Figure 1 is a view, partly in section, of the roll of my invention.
Figure 4:
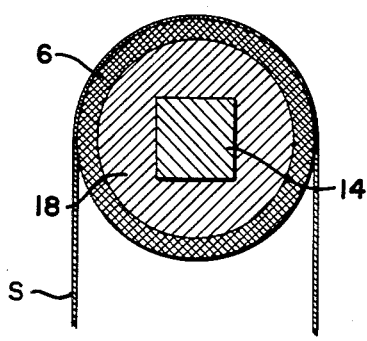
Figure 4 is a sectional view taken on the line IV—IV of Figure 1.

Referring more particularly to the drawings, reference numeral 2 indicates a rotatable roll over which a strip or strip like material S passes. The roll 2 consists of a shaft 4 having a plurality of discs 6 mounted thereon. The roll shaft 4 is supported by means of axially aligned bearings 8 arranged in housing 10. If it is desired to drive the roll an extension 12 can be provided at one end of the shaft 4. The main portion 14 of the shaft between the bearings 8 is square in cross section. A threaded portion 16 is provided on the shaft between the portion 14 and each bearing 8. A separator 18 is welded to the center of the shaft and extends radially outwardly to within a short distance of the outer edge of the discs 6. The separator 18 has convex sides 20. A retainer 22 having a square axial hole 24 therethrough is mounted on the square portion 14 at each end of the shaft 4. The inwardly facing side 26 of each of the retainers is concave. The retainers 22 extend radially to within a short distance of the outer edge of the discs 6. Each of the retainers 22 are held in position by means of a jam nut 28.

Figure 2:
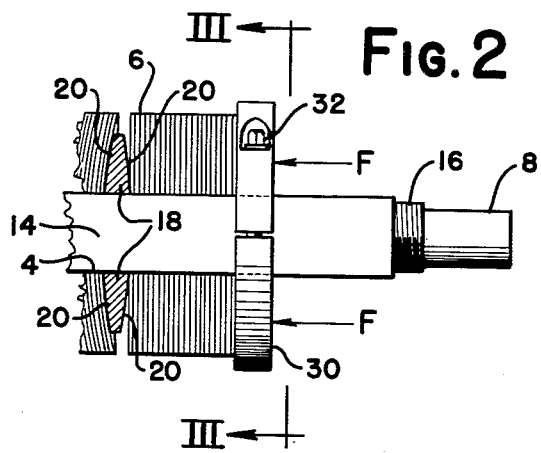
Figure 2 is a sectional view of the roll of Figure 1 in an intermediate stage of its manufacture.
Figure 3:
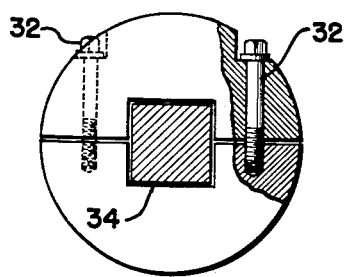
Figure 3 is a view taken on the line III—III of Figure 2.

The roll is made as follows: The separator 18 is welded to the center of the shaft. A plurality of the discs 6 which are originally flat and made of flannel-like or other flexible material are then slid over the square portion 14 of the shaft and a split collar 30 is then placed on the square portion of the shaft adjacent the discs 6, as shown in Figure 2. It will be noted that the collar 30 consists of two parts held together by means of two cap screws 32. A square opening 34 is provided in the collar 30. The bolts 32 of the collar are not tightened so that it is possible for the collar to slide along the shaft. A force F is then applied to the collar to force the discs 6 against the surface 20 after which the bolts 32 are tightened in order to clamp the collar 30 to the shaft. The force F is then removed and a second set of discs is slid on the shaft against the collar 30. The retainer 22 is placed on the shaft against the discs and force F is applied to the retainer 22 to press the discs into position. The retainer 22 is held in place and the collar 30 is removed after which force F is applied to the retainer 22 causing the second set of discs to be forced against the first set to move all the discs to their final position. The jam nut 28 is then screwed on to the threaded portion 16 and the force F removed. If desired the jam nut 28 can be held in position by means of a tack weld. The operation is then repeated for the other half of the roll. It will be noted that because of the shape of the surfaces 20 and 26 the discs 6 are bent from their flat circular shape to a position where their outer edges are bowed inwardly toward the transverse center of the shaft. Considerable force such as approximately thirteen tons is necessary to position the discs on the shaft in their final position. The holes in the discs are smaller than the outside diameter of the square portion 14, thus insuring that the discs will rotate in unison with each other and with the shaft 4. After the discs are assembled on the shaft the outside surface of the roll 2 is ground to the desired shape which may be cylindrical or with a crown in the center. It will be understood that the discs for each half of the roll may be applied in more than two sets or groups depending upon the width of the roll. Also, it is not necessary to keep the collar 30 on the shaft between the different sets of discs, but that it may be removed as soon as the discs of one set are forced into position and then placed on the shaft against the next succeeding set of discs.

The roll formed in the manner described above is similar to the rolls of my above mentioned patent in that each disc functions as a flexible projection which is free to move inwardly toward the transverse center of the roll. The support provided by the surfaces 20 and 26 insure that the discs 6 will always move in the desired direction to center an object passing thereover in the same manner as in my above mentioned patent. This type of roll is advantageously used as a pinch roll since the pinch pressure will cause the discs to lay over more and increase the centering action.

While one embodiment of my invention has been shown and described it will be apparent that other adaptations and modifications may be made without departing from the scope of the following claim.

I claim:

The method of making a self-centering roll which comprises providing a shaft of substantially uniform non-circular cross section intermediate its ends, fastening a separator having convex sides to the shaft adjacent the center thereof, providing a plurality of thin flat circular flexible discs of substantially uniform outside diameter, each having a central opening of less diameter than that of the intermediate portion of the shaft, forcing a plurality of said discs over said shaft into tight engagement with said convex sides and with each other so as to bend them into conical shape, positioning a retainer over each end of said shaft against said discs, said retainers having a concave face adjacent said discs, and then fastening said retainers in said position.

References Cited in the file of this patent

UNITED STATES PATENTS

| | | |
|---|---|---|
| 822,772 | Robinson | June 5, 1906 |
| 2,592,581 | Lorig | Apr. 15, 1952 |